United States Patent [19]

Endo et al.

[11] Patent Number: 4,698,191
[45] Date of Patent: Oct. 6, 1987

[54] METHODS OF PRODUCING MOLDED PRODUCTS FROM FOAMED POLYPROPYLENE PARTICLES

[75] Inventors: Hiroshi Endo; Masakazu Arai; Shigeo Nishikawa; Masanori Saito; Masahiro Tanaka; Kunikazu Nagasaki; Shigeki Mathuno, all of Mie, Japan

[73] Assignee: Mitsubishi Yuka Badische Co., Ltd., Yokkaichi, Japan

[21] Appl. No.: 823,733

[22] Filed: Jan. 29, 1986

[51] Int. Cl.$^4$ ............................................. C08J 9/22
[52] U.S. Cl. ............................ 264/50; 264/DIG. 15; 264/DIG. 16; 425/4 R
[58] Field of Search ........ 264/50, DIG. 15, DIG. 16; 425/4 R

[56] References Cited

U.S. PATENT DOCUMENTS 3,504,068 3/1970 Zizlsperger et al. ................. 264/41
4,399,087 8/1983 Akiyama et al. ...................... 264/53

FOREIGN PATENT DOCUMENTS 1445474 8/1976 United Kingdom .

Primary Examiner—Philip Anderson
Attorney, Agent, or Firm—Oblon, Fisher, Spivak, McClelland & Maier

[57] ABSTRACT

A method of producing a polypropylene resin molded product from foamed polypropylene particles is disclosed, which comprises introducing a pressurizing gas into foamed polypropylene particles having closed cells so that the particles have an internal gas pressure of from 0.3 to 2.5 Kg/cm$^2$G, charging the particles in a mold cavity while compressing the particles with a pressurizing inorganic gas until the initial apparent volume of the particles is reduced to 50 to 99%, removing the gas from the mold cavity while keeping the foamed particles in a compressed state, and introducing steam in the cavity to cause adhesion of the compressed foamed particles. The method produces a molded product having satisfactory appearance and excellent adhesion among particles in a shortened molding cycle.

7 Claims, 1 Drawing Figure

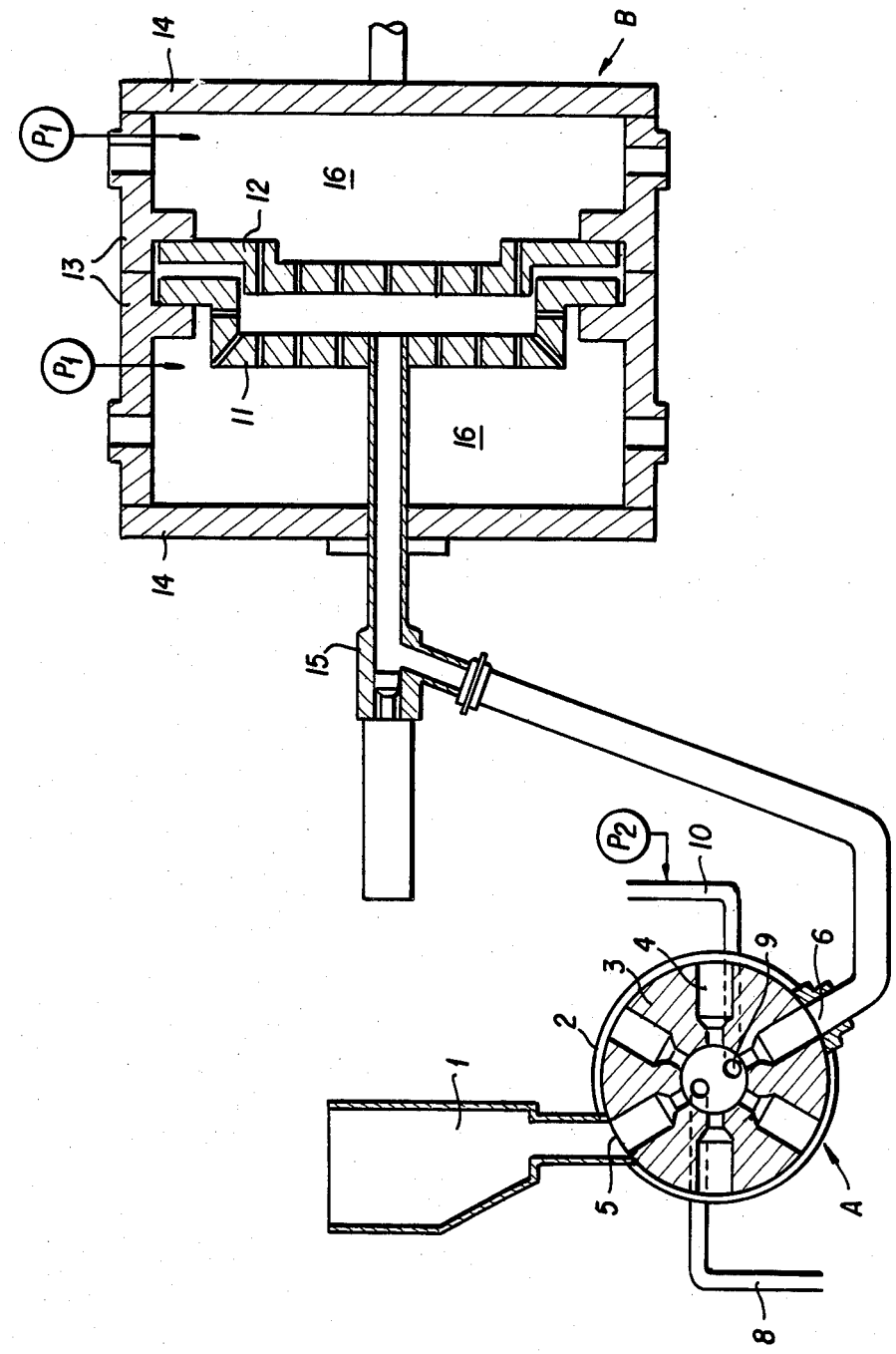

METHODS OF PRODUCING MOLDED PRODUCTS FROM FOAMED POLYPROPYLENE PARTICLES

FIELD OF THE INVENTION

This invention relates to a method of producing a molded product from a polypropylene resin which is useful as a heat-insulating material, such as walls, floor materials, etc., and cushioning materials, such as cores fo bumbpers of automobiles.

BACKGROUND OF THE INVENTION

A conventional method which has been widely employed for producing molded products having a foamed structure comprises preliminarily foaming a styrene resin containing a foaming agent and, after allowing the preliminarily foamed resin particles to stand in air for a while, continuously charging them in a closed or open mold under reduced pressure or normal pressure, followed by heating to thereby expand and adhere to each other.

This method is advantageous for easily producing molded products having complicated shapes that are used as keep-fresh containers, cushioning packing materials, heat-insulating materials, and the like.

However, this method is limited to expansion molding of polystyrene resins and cannot be applied to expansion molding of polyolefin resins to obtain molded products of complicated shapes. The reason is that polyolefin resins are so inferior to polystyrene resins in terms of long-term preservability in the state having foamability that gases occluded in resin particles escape in a short time.

Foams of polyolefins, e.g., crosslinked polyethylene, non-crosslinked polypropylene, crosslinked polypropylene, etc., are superior to polystyrene foams in mechanical strength and oil-resistance and, therefore, have been used as a core material of a bumber, a cushioning material for packing TV sets, electric refrigerators, etc., and the like.

Known methods for molding such foamed polyolefins in a mold include the following methods:- (1) A method involving aging under pressure (hereinafter referred to as "pressure aging molding method"), in which a pressurizing inorganic gas is pressed into foamed resin particles of crosslinked polyethylene, followed by releasing the pressure to expand the resin particles to obtain resin particles having an internal gas pressure greater than 1.18 atm. that do not contract any more, and the resulting particles are charged in a mold having steam holes under normal pressure or reduced pressure and then steam-heated while keeping the pressure greater than 1.18 atm. in the inside of the particles to cause their expansion and adhesion to form a molded article, as disclosed in British Patent No. 1,445,474 (Japanese Patent Publication No. 22951/76).

(2) A pressure aging molding method, in which a pressurizing inorganic gas or mixed gas of an inorganic gas and a volatile organic blowing agent is pressed into foamed polypropylene resin particles to form particles having a total gas pressure of from 1.4 to 2.5 $Kg/cm^2G$ in the inside thereof with partial pressures of the inorganic gas and the volatile organic blowing agent being from 0.4 to 1.1 $Kg/cm^2G$ and from 0.8 to 1.6 $Kg/cm^2$, respectively, and the resulting resin particles are charged in a mold having steam holes under normal pressure, followed by steam-heating to cause adhesion to obtain a molded article, as disclosed in Denish Patent No. 3,125,024 (Japanese Patent Application (OPI) No. 12035/82, the term "OPI" herein used means "published unexamined application").

(3) A method comprising applying a pressure to foamed polyolefin resin particles at a temperature of 100° C. or higher to compress the particles so as to decrease the apparent volume to 90 to 40% on the initial volume, charging the compressed particles in a mold under pressure, releasing the pressure in the mold to atmospheric to cause expansion and adhesion as disclosed in U.S. Pat. No. 3,504,068, or a method comprising charging heated polyolefin foamed particles in a mold, increasing the pressure within the mold to compress the particles and, after reducing the volume of the mold, relieving the pressure within the mold to atmospheric to cause expansion and adhesion, and (4) A method involving compression charging (hereinafter referred to as "compression charging molding method"), which comprises compressing crosslinked polyethylene foamed particles to a volume of 40 to 80% of the initial apparent volume with a pressurizing inorganic gas or volatile organic blowing agent, charging the compressed particles in a mold having steam holes, and steam-heating the particles to cause their adhesion as disclosed in Japanese Patent Publication No. 33996/78.

The pressure aging molding methods (1) and (2) are more advantageous than the compression charging molding methods (3) and (4) in that molded products having excellent appearance without voids among expanded particles, but are disadvantageous in that the pressure aging including pressing of foamed particles with an inorganic gas and pressure release to obtain foamed particles free from contraction requires a long time over 20 to 40 hours, thus reducing productivity.

The method (3) involves heating of the foamed particles outside the system and, therefore, entails cost for facilities and operation, thus giving rise to a bar to industrial application.

The compression charging method (4) is superior to the above-described pressure aging methods but requires use of highly bulky foamed particles having a small density since the foamed particles should be charged in a mold as being compressed to a volume of 40 to 80% on the initial apparent volume. As a result, transportation of the foamed particles from a maker manufacturing the foamed particles to a maker processing the foamed particles into molded products and also storage of the foamed particles entail a so much increased cost.

Further, according to the methods (3) and (4), foamed particles having a volume several to several tens times that to be charged in a mold should be compressed all at once and charged in a mold making use of a difference in pressure between a mold and a pressure-proof vessel while maintaining the atmosphere in the mold under normal pressure or under slightly elevated pressure. Therefore, it is difficult to use a mold having a complicated shape. In order to overcome this difficulty, charging may be carried out, in some cases, with a parting part between a plug and a cavity open (cracking) and, after the charging, the molding is effected in a closed mold. However, a molded article obtained by this modified method has uneven density distribution due to significantly increased density in the portion corresponding to the parting part.

Furthermore, in the above-described compression charging molding methods, when low-expansion polyethylene foamed particles (high density foamed particles) or relatively rigid foamed particles (i.e., having high compressive strength), e.g., polypropylene, etc., are used, high cost for facilities and operation would be required for compressing such foamed particles with a pressurizing gas and charging the compressed particles in a mold by pneumatic conveying, which leads to a remarkable disadvantage in carrying out the production on industrial scale.

SUMMARY OF THE INVENTION

Accordingly, an object of this invention is to eliminate the disadvantages associated with a pressure aging molding method, i.e., a long molding cycle, by combining a pressure aging molding method and a compression charging molding method.

More particularly, an object of this invention is to provide a method of producing a foamed polypropylene product having a uniform density distribution and satisfactory appearance irrespective of its shape.

In a method wherein foamed particles are charged in a mold cavity having steam holes and heated to adhere, voids are inevitably generated among foamed particles in the cavity. According to the pressure aging molding methods (1) and (2), an inorganic gas or a volatile organic blowing agent is impregnated into foamed particles to impart expandability to them and the expandable foamed particles are expanded upon heating to thereby fill the voids. On the other hand, the compression charging molding methods (3) and (4) utilize a restoring force of the compressed foamed particles upon pressure release in order to fill the voids.

The present invention comprising a combination of these two types of molding methods makes it possible not only to shorten a molding cycle and a pressure aging time according to the pressure aging method but also to obtain a molded product having satisfactory appearance that has never been attained by the compression charging method.

For the purpose of filling the voids among particles in the mold cavity, the present invention utilizes both the expansion force of an inorganic gas and/or a volatile organic blowing agent impregnated into foamed particles and the restoring force of the compressed foamed particles. Thus, an internal gas pressure of the cells to be reached can be reduced thereby to shorten the molding cycle as compared with the pressure aging molding method alone.

That is, the present invention relates to a method of producing a polypropylene resin molded product from foamed polypropylene particles, which comprises introducing a pressurizing gas into foamed polypropylene particles having closed cells so that the particles have an internal gas pressure of from 0.3 to 2.5 Kg/cm$^2$G, charging the particles in a mold cavity while compressing the particles with a pressurizing inorganic gas until the initial apparent volume of the particles is reduced to 50 to 99%, removing the gas from the mold cavity while keeping the foamed particles in a compressed state, and introducing steam in the cavity to cause adhesion of the compressed foamed particles.

BRIEF DESCRIPTION OF ACCOMPANYING DRAWING

FIG. 1 is a cross-sectional partial view of an example of an apparatus used in the present invention, in which A is a rotary feeder of foamed particles and B is a mold.

DETAILED DESCRIPTION OF THE INVENTION

In a preferred embodiment of the present invention, the foamed particles having an internal gas pressure are charged in a mold cavity in several divided portions while controlling the compression ratio of the foamed particles at the time of molding within a specific range. According to this preferred embodiment, the density distribution of the resulting molded product can be made more uniform.

More specifically, foamed polypropylene resin particles are pressurized with a pressurizing gas having a pressure higher than the pressure inside a mold cavity by at least 0.5 Kg/cm$^2$ for a period of 1 hour or more, and the foamed particles having an internal gas pressure are charged in the cavity having an elevated pressure of from 0.5 to 5.0 Kg/cm$^2$G in several divided portions using a pressurizing gas having a pressure higher than that of the cavity by at least 0.5 Kg/cm$^2$. During the charging, the pressure inside the cavity is maintained within the above-recited range. After completion of the charging, the pressure of the mold cavity is reduced to atmospheric, and the heating is effected to adhere the particles to each other. The compression ratio during the molding is controlled so as to be not less than 1% and less than 40%. The term "compression ratio" herein used is defined by the following formula:

$$\text{Compression Ratio (\%)} = \frac{W/\sigma - V}{W/\sigma} \times 100$$

wherein W represents a weight (g) of a molded product; V represents a volume (l) of a molded product; and $\sigma$ represents a bulk density (g/l) of foamed particles in air.

The foamed particles which can be used in the present invention are polypropylene particles having a bulk density of from 10 to 90 g/l and a particle diameter of from 2 to 5 mm. The foamed polypropylene particles may be either crosslinked or non-crosslinked. Polypropylene resins to be used include a propylene homopolymer, an ethylene-propylene random copolymer having an ethylene content of from 1 to 12% by weight, an ethylene-propylene-butene-1 random copolymer having an ethylene content of from 1 to 10% by weight and a butene-1 content of from 2 to 10% by weight, a propylene-ethylene block copolymer, a silane-modified polypropylene and crosslinked products of these polymers.

In addition, a polymer blend of the above-described polymers or a polymer blend of these polymers with less than 50% by weight of other polymers, e.g., polyisobutyrene, ethylene-propylene rubber, polyethylene, an ethylene-vinyl acetate copolymer, etc., may also be employed.

The foamed particles which can be used in the present invention include those prepared by extruding a mixture of polypropylene and a thermally decomposable foaming agent in an extruder into a strand, followed by foaming, and crosslinking the foams in pellets; those prepared by impregnating a volatile blowing agent, e.g., dichlorodifluoromethane, butane, etc., into polypropylene particles to impart them foamability and foaming them by heating; those obtained by crushing polypropylene foamed products; those prepared by dispersing polypropylene particles containing an inorganic filler in water to impregnate the particles with water, heating the particles under pressure in an autoclave and releasing the particles from the autoclave together with water into an atmosphere; and the like. Processes for preparing these polypropylene foamed particles are described, e.g., in Japanese Patent Publication Nos. 38716/71, 2183/74, 22951/76, 1344/81 and 17890/82 and Japanese Patent Application (OPI) Nos. 34458/72, 90027/82, 55231/83 and 197027/83, etc.

The foamed particles may contain stabilizers, such as 2,6-t-butylphenol, etc., ultraviolet absorbents, dyes, pigments, such as titanium oxide, carbon black, etc., lubricants, such as higher fatty acid metal salts, etc., surface modifiers, such as higher fatty acid triglycerides, etc., and the like.

The foamed particles usually have a proportion of closed cells to total cells of more than 70%, and preferably more than 85%.

In order to impart expandability to foamed polypropylene particles, the foamed particles are kept in a pressurizing gas atmosphere to elevate the internal pressure of the cells up to 0.3 to 2.5 $Kg/cm^2G$. The pressurizing treatment is carried out by placing the foamed particles in a pressure-proof vessel and feeding a pressurizing gas thereto under a pressure of from 0.5 to 5 $Kg/cm^2G$ for a period of from 5 to 20 hours. The temperature of the pressurizing treatment is usually room temperature but may be an elevated temperature, and can be determined taking into account the material of the foamed particles, particle diameter, treating time, and the like. The pressurizing gas may be an inorganic gas and/or a volatile organic blowing agent.

The inorganic gas includes air, nitrogen, argon, neon, carbon dioxide, etc. The volatile organic blowing agent includes propane, butane, pentane, cyclobutane, trichlorofluoromethane, dichlorodifluoromethane, methyl chloride, etc. Of these, air is preferred from an economical point of view.

Methods for pressurizing are described, e.g., in Japanese Patent Publication Nos. 22951/76 and 30304/77 and Japanese Patent Application (OPI) Nos. 12035/82 and 101025/83. For the purpose of obtaining molded products having uniform density, however, it is preferable to use a hereinafter described apparatus, in which foamed particles are pressurized to have a prescribed internal gas pressure and the thus obtained expandable foamed particles are charged in a mold cavity in divided portions using compressed gas.

By the pressurizing treatment, the gas introduced is impregnated into the foamed particles so as to result in an internal gas pressure of from 0.3 to 2.5 $Kg/cm^2G$. Internal gas pressures less than 0.3 $Kg/cm^2G$ are insufficient to fill the voids among the resin particles by adhesion to each other upon steam-heating. On the other hand, internal pressures exceeding 2.5 $Kg/cm^2G$ require an unfavorably prolonged treating time.

The thus pressurized foamed particles are stored in a hopper and compressed therein with a pressurizing gas to an apparent volume of 50 to 99%, and preferably 61 to 90%, of the initial apparent volume, i.e., to a compression ratio of from 1 to 50%, and preferably from 10 to 39%. Thereafter, the compressed particles are charged in a mold cavity kept under a pressure of from 1 to 10 $Kg/cm^2G$ which is composed of a pair of cavity (female) and plug (male), followed by closing the filling opening. The gas is vented while keeping the foamed particles in a compressed state to decrease the pressure inside the mold cavity to atmospheric pressure or near to atmospheric pressure, whereby the voids among the particles are filled by the restoring force of the compressed foamed particles.

The pressurizing gas for compression charging includes the same examples as recited above. From the standpoint of economy and safety, inorganic gases, e.g., air, nitrogen, etc., are usually employed.

The pressure of the inorganic gas, etc. for compression is above atmospheric pressure and can be decided depending on the desired degree of compression, time required for compression, and so on. It usually ranges from 1 to 10 $Kg/cm^2G$, and preferably from 3 to 5 $Kg/cm^2G$. The temperature for compression is lower than the softening point of polypropylene.

It is desirable for shortening a molding cycle that the mold be previously heated before charging the foamed particles.

The degree of compression of the foamed polypropylene particles, i.e., a compression ratio, can be expressed by a relation between a volume of a mold and a volume of foamed particles in the atmosphere. The volume of a mold is a volume of a space formed by a male and a female. Although it is difficult to directly measure the volume of a mold, it may be regarded substantially equal to a volume of a molded product formed in the space of the mold. Accordingly, the compression ratio (%) of the foamed particles can be obtained through the following formula:

$$\begin{aligned}
\text{Compression Ratio (\%)} &= \\
&\frac{\text{(Volume of Foamed Particles Charged in Mold in the Atmosphere)} - \text{(Inner Volume of Mold)}}{\text{(Volume of Foamed Particles Charged in Mold in the Atmosphere)}} \times 100 \\
&\approx \frac{\text{(Volume of Foamed Particles Charged in Mold in the Atmosphere)} - \text{(Volume of Molded Product)}}{\text{(Volume of Foamed Particles Charged in Mold in the Atmosphere)}} \times 100 \\
&= \frac{W/\sigma - V}{W/\sigma} \times 100
\end{aligned}$$

wherein W, V and $\sigma$ are as defined above.

The above defined compression ratio participates in expansion mechanism of a molded product. Specifically, within a compression ratio of from about 40 to 50% (volume ratio: about 50 to 60%), the compressed foamed particles are charged to the possible highest density so that the air within the mold hardly escapes out of the mold, which leads to extension of a requisite period of steam heating. Moreover, there are few voids present among the particles, and the force to fill the voids is attributed only to the restoring force of the compressed foamed particles. On the other hand, within a compression ratio between 1% and about 40%, many voids are formed among the particles so that the air within the mold is easily discharged out of the mold. Besides, the heating cycle can be shortened because heating steam readily passes through the voids. Further, both the restoring force of the compressed foamed particles and the internal pressure imparted to the foamed particles can contribute to filling of the voids. Therefore, if the compression ratio of the foamed particles is controlled to fall within a range of from 1% to 50%, and preferably from 1 to less than 40%, a molded product having satisfactory adhesion free from voids and uniform density can easily be obtained even when molding is carried out using foamed particles having a high bulk density at a markedly reduced compression ratio. Possibility of using foamed particles having a high bulk density offers a great industrial advantage in terms of production and transportation of foamed particles.

The conventional method of molding foamed polypropylene particles only produces molded products showing insufficient adhesion and containing large voids due to poor expandability if the compression ratio is less than 40%. To the contrary, the present invention makes it possible to uniformly charge the foamed particles in a mold cavity without large voids and to produce molded products showing satisfactory adhesion free from voids even with a compression ratio as low as less than 40% by a method of charging foamed particles having an internal pressure in several divided portions using a pressurizing gas.

In the above-described preferred embodiment in which the compression ratio is controlled below 40%, it is necessary to use foamed particles having an internal pressure that are obtained by preliminarily pressurizing foamed particles with a pressurizing gas having a pressure higher than the pressure within the mold by at least 0.5 Kg/cm² for at least 1 hour. The preliminary pressurizing treatment can be carried out by any of known methods. For example, foamed particles are placed in a pressure-proof vessel, and a gas of a prescribed pressure is fed into the vessel for a period of from 1 to 20 hours, and preferably from 3 to 15 hours, at room temperature or under heating. The pressure of the pressurizing gas is usually higher than that within the mold by 0.5 to 10 Kg/cm². By this pressurizing treatment, the gas impregnates into the cells of the foamed particles to thereby impart an internal gas pressure of 0.3 Kg/cm²G or more in the case when the compression ratio is from 40 to 50%, and of 0.5 Kg/cm²G or more, and preferably of from 0.7 to 2.0 Kg/cm²G, in the case when the compression ratio is from 1 to less than 40%. If the internal pressure is less than 0.3 Kg/cm²G or 0.5 Kg/cm²G in the respective case, the resulting molded product has insufficient adhesion due to large voids among particles. If it exceeds 2 Kg/cm²G, molding unfavorably requires a long time.

Further, in the preferred embodiment wherein the compression ratio is controlled below 40%, the pressure inside the mold is kept at 0.5 to 5.0 Kg/cm²G with a pressurizing gas before and during the charging. General foamed polypropylene resin particles have a bulk density of from 10 to 90 g/l and the above specificied mold inner pressure is the optimum for molding such foamed particles at a compression ratio less than 40%. If the gas pressure in the mold is less than 0.5 Kg/cm²G, a compression ratio less than 40% can hardly be attained, and an inner mold pressure exceeding 5 Kg/cm²G tends to result in a compression ratio more than 40%.

The foamed particles having been subjected to pressurizing treatment are charged in the mold in several divided portions using a pressurizing gas having a pressure higher than the above-recited inner pressure of the mold by at least 0.5 Kg/cm². Use of a pressurizing gas having the above-described pressure is effective to facilitate charging of the foamed particles in a mold and movement of the foamed particles within the mold. If the pressure of the pressurizing gas for charging is not higher than the inner pressure of the mold by at least 0.5 Kg/cm², the charging of the foamed particles in a mold under pressure cannot sufficiently be effected. Divided charging of the foamed particles in several portions aims at uniform charging into all the corners of the mold.

An embodiment for carrying out the method of the present invention will be illustrated below with reference to the accompanying drawing.

FIG. 1 is a cross-sectional view of an example of an apparatus used in the preferred embodiment according to the present invention, in which A is a rotary feeder of foamed particles and B is a mold.

A pressurizing gas having pressure $P_1$ of from 0.5 to 5.0 Kg/cm²G, e.g., compressed air, is introduced into spaces formed by female 11 or male 12, frames 13 and backing plates 14, i.e., steam chambers 16, to keep the inner pressure of mold B within the above range.

Rotary feeder A is composed mainly of casing 2 and rotor 3. Rotor 3 has a plurality of chambers 4. When one end each of the chambers is connected to feed opening 5 of hopper 1, the another end is connected to vacuum port 7 of vacuum-line 8 as shown in FIG. 1, whereby the previously pressurized foamed particles in hopper 1 are transferred to one of chambers 4 by vacuumizing to fill the chamber, and both the ends of the chamber filled with the foamed particles are closed. Rotary feeder A is then rotated until the one end of the foamed particle-filled chamber is connected to discharge opening 6, with the another end thereof being connected to outlet 9 of pressurizing line 10, through which a pressurizing gas having pressure $P_2$ that is higher than $P_1$ by at least 0.5 Kg/cm² is introduced in the chamber. The thus compressed foamed particles are then charged in the cavity of mold B formed by male 11 and female 12 that is kept under pressure $P_1$ through charging gun 15. Then, transfer of the foamed particles from hopper 1 to another chamber is repeated until a prescribed amount of the foamed particles in hopper 1 is charged in the mold cavity in several divided portions.

After a prescribed amount of the foamed particles is charged in the mold, the pressure inside the mold is once reduced to atmospheric. Steam at a prescribed concentration is then supplied to steam chambers 16 to effect heating thereby causing expansion and adhesion of the foamed particles to each other, followed by cooling to complete molding. The voids among foamed particles are partly filled by the above-described pressure release in the mold, and the voids that remain unfilled are then completely filled by the expansion of the pressurized gas occluded in the cells upon steam heating.

The steam pressure is from 0.2 to 6 Kg/cm²G. The mold to be used may comprise a male and a female both of which have steam holes (or slits) or comprise a male and a female either one of which has steam holes with the another having no steam holes as shown in FIGS. 1 and 4 of West German Patent Publication (OLS) No. 2,928,119.

It is advantageous to prevent formation of cavities in the resulting molded product by evacuation of the inorganic gas present among the foamed particles in the mold. Evacuation of the inorganic gas can be carried out by a method, in which steam is introduced in one of partitioned steam chambers, as used in the above-cited West German patent publication and, after the steam supply to one of the chambers is once stopped, steam is introduced in another partitioned steam chamber, and then steam is supplied to both the chambers to effect heating for molding; and a method, in which steam is first introduced to a steam chamber of a female and, after the steam supply to the chamber of a female is once stopped, steam is introduced to a steam chamber of a male, and then steam is supplied to both the steam chambers to effect heating.

Cooling after steam molding can be carried out by introducing cooling water at 5° to 60° C. into the mold.

The thus produced molded product has a bulk density of from 10 to 90 g/l and satisfactory appearance substantially free from voids or cavities in the interior thereof.

The present invention will now be illustrated in greater detail with reference to the following examples and comparative examples. In these examples, all the parts and percents are by weight unless otherwise indicated.

REFERENCE EXAMPLE 1

In an autoclave were charged 250 parts of water, 100 parts of an ethylene-propylene copolymer particles having an ethylene content of 4% and a melting point of 140° C., 0.7 part of calcium tertiary phosphate having a particle size of from 0.3 to 0.5 $\mu$m and 0.007 part of sodium dodecylbenzenesulfonate. Nitrogen gas was introduced therein under stirring until an inner pressure of the autoclave reached 5 $Kg/cm^2G$. After the nitrogen supply was stopped, 24 parts of isobutane was fed to the closed vessel. When the system was heated to 135° C. over a period of 1 hour and held at that temperature for an additional 30 minutes, the inner pressure of the autoclave reached 23 $Kg/cm^2G$.

A valve of a discharge nozzle at the bottom of the autoclave was opened to liberate the dispersion in the autoclave into the atmosphere for about 2 seconds to effect foaming.

The resulting foamed polypropylene particles had a bulk density of about 21.8 g/l and no blocking among foamed particles was observed.

REFERENCE EXAMPLE 2

In a 3 liter-volume autoclave having a pressure resistance of 50 $Kg/cm^2G$ were charged 1,400 parts of water, 600 parts of an ethylene-propylene copolymer (Mitsubishi Norblene FG-3 produced by Mitsubishi Petrochemical Co., Ltd.; melt flow rate: 9; ethylene content: 3%), 15 parts of calcium tertiary phosphate as a suspending agent, 0.05 part of sodium dodecylbenzenesulfonate as a surface active agent and 100 parts of butane as a blowing agent. The mixture was heated up to 135° C. over a period of 1 hour while stirring at 430 rpm and kept at that temperature for 10 minutes, whereby the inner pressure of the autoclave rose to 25 $Kg/cm^2G$. The discharge nozzle vent at the bottom of the autoclave was opened and the content was liberated therethrough into air for 2 seconds with stirring at 180 rpm to effect foaming. The resulting foamed particles had a bulk density of 30 g/l.

EXAMPLE 1

The foamed polypropylene particles having a bulk density of 21.8 g/l as obtained in Reference Example 1 were put in a pressure-proof vessel, and air of 3 $Kg/cm^2G$ was supplied thereto. The atmosphere in the vessel was maintained under that pressure for 10 hours, followed by releasing to atmospheric pressure to obtain foamed particles having an internal gas pressure of 0.75 $Kg/cm^2G$.

Ten liters of the foamed particles were put in a pressure-proof cylindrical container (hopper) and compressed with compressed air of 3 $Kg/cm^2G$ to a volume of 6.6 liters corresponding to 66% of the initial bulk volume. The compressed foamed particles were then charged in a mold for producing a packing container having an internal volume of 5.8 liters composed of a pair of a male and a female which had been held under a pressure of 2.5 $Kg/cm^2G$ for 10 seconds. After a charging gun was closd, the pressure inside the mold cavity was reduced to 0.5 $Kg/cm^2G$.

Steam of 3 $Kg/cm^2G$ was introduced into a steam chamber of a male mold for 4 seconds, and then into a steam chamber of a female mold for 4 seconds. Thereafter, steam of the same pressure was introduced to both the chambers for 8 seconds to cause adhesion of the foamed particles to each other.

The supply of steam was stopped, and the mold was cooled to 60° C. for 90 seconds. The mold was opened to obtain a molded product having a bulk density of about 33 g/l.

The resulting product had satisfactory appearance with a smooth surface, and no cavities or voids were observed in a cut area thereof.

EXAMPLES 2 TO 4

Molded products were produced from foamed polypropylene particles in the same manner as described in Example 1 but changing the conditions as shown in Table 1. The physical properties of the resulting molded products are shown in Table 1.

COMPARATIVE EXAMPLE 1

The foamed polypropylene particles having a bulk density of 21.8 g/l as obtained in Reference Example 1 were placed in the same hopper as used in Example 1 and compressed with nitrogen gas of 3 $Kg/cm^2G$ to a volume 50% of the initial bulk volume. The compressed foamed particles were supplied to a mold cavity which was kept under a pressure of 2.5 $Kg/cm^2G$ and molded under the conditions shown in Table 1. The physical properties of the resulting molded product are also shown in Table 1.

COMPARATIVE EXAMPLES 2 TO 3

Molded products were produced in the same manner as described in Comparative Example 1 but changing the molding conditions as shown in Table 1. The physical properties of the resulting molded products are also shown in Table 1.

COMPARATIVE EXAMPLE 4

Foamed particles having a bulk density of about 30 g/l prepared from a propylene-ethylene random copolymer having an ethylene content of 4% were placed in a hopper, and pressurized air of 3 $Kg/cm^2G$ was fed to the hopper. After the atmosphere in the hopper was maintained under that pressure for 40 hours, the pressure was reduced to atmospheric to obtain foamed particles having an internal pressure of 1.8 $Kg/cm^2G$.

The resulting foamed particles were charged in the same mold as used in Example 1 and molded under the conditions shown in Table 1 to obtain a molded product having a bulk density of about 31 g/l.

COMPARATIVE EXAMPLE 5

A molded product was produced in the same manner as described in Comparative Example 4 but changing the molding conditions as shown in Table 1. The physical properties of the resulting molded product are shown in Table 1 below.

In Table 1, evaluation of appearance and formation of cavities or voids of the molded product was in accordance with the following standards.

was kept at 2.0 Kg/cm$^2$G by operating a pressure-control valve (not shown).

After completion of the charging, the charging gun was closed, and the inner pressure of the mold ($P_1$) was reduced to atmospheric pressure to restore the compressed foamed particles to their initial form. Steam of 3 Kg/cm$^2$G was introduced first into chamber 16 of the male mold side 12, i.e., the movable half side, for 10 seconds and then into both chamber 16 of the male mold side 12 and chamber 16 of the female mold side 11, i.e., the stationary mold side, for 10 seconds, to thereby cause adhesion of foamed particles by heating.

TABLE 1

|  | Example No. | | | | Comparative Example No. | | | | |
|---|---|---|---|---|---|---|---|---|---|
|  | 1 | 2 | 3 | 4 | 1 | 2 | 3 | 4 | 5 |
| Bulk Density of Foamed Particles (g/l) | 21.8 | 21.8 | 21.8 | 21.8 | 21.8 | 21.8 | 21.8 | 30 | 40 |
| Pressurizing Treatment: | | | | | | | | | |
| Pressure (Kg/cm$^2$G) | 3 | 3 | 3 | 3 | — | — | — | 3 | 3 |
| Treating Time (hr) | 10 | 10 | 5 | 5 | — | — | — | 40 | 20 |
| Cell Internal Pressure (Kg/cm$^2$G) | 0.75 | 0.75 | 0.6 | 0.6 | — | — | — | 1.8 | 1.7 |
| Compression Charging: | | | | | | | | | |
| Pressure (Kg/cm$^2$G) | 3 | 2 | 3 | 2 | 3 | 2 | 1.5 | — | — |
| Volume Ratio After Compression (%) | 66 | 75 | 62 | 73 | 50 | 64 | 76 | 97 | 97 |
| Time for Charging (sec) | 10 | 10 | 10 | 10 | 10 | 10 | 10 | 10 | 10 |
| Molding: | | | | | | | | | |
| Steam Pressure (Kg/cm$^2$G) | 3 | 3 | 3 | 3 | 3 | 3 | 3 | 3 | 3 |
| Heating Time (sec) | 16 | 16 | 16 | 16 | 16 | 16 | 16 | 16 | 16 |
| Cooling Temperature (°C.) | 60 | 60 | 60 | 60 | 60 | 60 | 60 | 60 | 60 |
| Optimum Cooling Time (sec) | 90 | 60 | 80 | 45 | 100 | 40 | 30 | 100 | 100 |
| Molded Product: | | | | | | | | | |
| Bulk Density (g/l) | 33 | 29 | 35 | 30 | 40 | 34 | 28.5 | 31 | 41 |
| Appearance | ⊚ | ⊚ | ○ | ○ | Δ | X | X | ⊚ | ⊚ |
| Formation of Cavities | ⊚ | ⊚ | ○ | ○ | Δ | X | X | ⊚ | ⊚ |

Appearance:
⊚: Excellent in surface gloss and smoothness; no deformation observed.
○: Excellent in surface gloss and smoothness; slight deformation observed.
X: Normal surface gloss, but collapse in places; deformation observed.
Formation of Cavities or Voids:
⊚: 5 or less cavities or voids per 100 cm$^2$ (10 × 10) of a cut area
○: 5 to 10 cavities or voids on the same basis as above
Δ: 10 to 20 cavities or voids on the same basis as above
X: 20 or more cavities or voids on the same basis as above

EXAMPLE 5

Foamed particles having a bulk density of 30 g/l as obtained in Reference Example 2 were placed in a hopper having a pressure resistance of 10 Kg/cm$^2$G, and compressed air of 4 Kg/cm$^2$G was fed thereto. After the atmosphere of the hopper was kept at that pressure for 10 hours, the pressure was reduced to atmospheric to obtain foamed particles having an internal gas pressure of 1.0 Kg/cm$^2$G.

The thus pressurized foamed particles were molded as follows using a molding machine as shown in FIG. 1, DAIYA-600LF, manufactured by Daisen Industry Co., Ltd. The mold used had a internal volume of 1.1 liter and was designed so as to produce a molded article of 300 mm in width, 300 mm in lenghth and 12.5 mm in height. The rotary feeder for the pressurized foamed particles contained 6 chambers each having a diameter of 35 mm, a length of 52 mm and a volume of 50 cc. The charging gun used had an inner diameter of 30 mm.

The mold was closed, and the pressure inside the mold was elevated to 2.0 Kg/cm$^2$G ($P_1$) with compressed air. Then, 1.3 liter portions of the above obtained pressurized foamed particles were successively charged from the rotary feeder in the mold at 0.1 second intervals using compressed air of 2.5 Kg/cm$^2$G. During the charging, the inner pressure of the mold ($P_1$)

After cooling the mold, the molded product was removed from the mold and dried. The compression ratio of the foamed particles at the time of molding was 15%. The resulting molded product had a weight of 39 g. This product was densely filled with particles into all the corners and had satisfactory adhesion among particles without cavities.

COMPARATIVE EXAMPLE 6

Foamed particles having a bulk density of 30 g/l as obtained in Reference Example 2 were palced in a hopper and preliminarily pressurized so as to have an internal gas pressure of 1.0 Kg/cm$^2$G in the same manner as described in Example 5. In a hopper was placed 1.3 liter of the pressurized foamed particles and compressed with compressed air of 2.5 Kg/cm$^2$G. The valve at the bottom of the hopper was opened, and the compressed particles were continuously charged through a charging gun in the same mold as used in Example 5 but having an inner pressure of 2.0 Kg/cm$^2$G. The charging gun was closed, and the pressure inside the mold was reduced to atmospheric to restore the particles to their initial form. The foamed particles were then steam-molded under the same conditions as in Example 5. The resulting molded product was not filled with particles into all the corners and contained large voids among particles and, therefore, did not withstand practical use.

COMPARATIVE EXAMPLE 7

A molded product was produced in the same manner as described in Example 5 but changing the gas pressure for charging ($P_2$) to 2.2 Kg/cm$^2$G or 2.4 Kg/cm$^2$G. The resulting molded particles had a poor commercial value due to large voids among particles.

EXAMPLES 6 TO 7 AND COMPARATIVE EXAMPLE 8

Foamed particles having a bulk density of 30 g/l as obtained in reference Example 2 were pressurized in the same manner as in example 5 to obtain foamed particles having an internal gas pressure of 0.3 Kg/cm$^2$G, 0.6 Kg/cm$^2$G, or 0.8 Kg/cm$^2$G, respectively and were charged in the mold at pressure inside the mold($P_1$) of 0.5 Kg/cm$^2$G, 0.5 Kg/cm$^2$ or 2.5 Kg/cm$^2$.

The resulting foamed particles were molded under the same conditions as used in Example 5. The results obtained are shown in table 2 below.

TABLE 2

|  | Example 6 | Comparative Example 8 | Example 7 |
|---|---|---|---|
| Foamed Particles: | | | |
| Bulk Density (g/l) | 30 | 30 | 30 |
| Volume Charged in Mold (liter) | 1.2 | 1.2 | 1.6 |
| Internal Gas Pressure (Kg/cm$^2$G) | 2.0 | 0.3 | 0.8 |
| Molding Conditions: | | | |
| Pressure Inside Mold ($P_1$) (Kg/cm$^2$G) | 0.5 | 0.5 | 2.5 |
| Pressure for Charging ($P_2$) (Kg/cm$^2$G) | 1.0 | 1.0 | 3.0 |
| Weight of Molded Product (Volume: 1.1 liter) (g) | 35 | 35 | 47 |
| Compression Ratio of Foamed Particles (%) | 7 | 7 | 30 |
| Molded Product: | | | |
| Filled State of Foamed Particles | excellent | excellent | excellent |
| Adhesion of Foamed Particles | excellent | poor | excellent |
| Voids Among Particles | none | significant | none |
| Deformation | none | significant | none |

The foregoing experimental results duly prove superiority exerted by the present invention as summarized below.

(1) Facilities that have been required in the conventional molding methods, such as pressure-proof hopper of a large volume, etc., are not needed in the present invention. Therefore, sites for such large-sized faciliteis are not required and the requisite amount of a pressurizing gas can be reduced.

(2) Since foamed particles having an internal gas pressure are charged in a mold in several divided portions using a pressurizing gas, the foamed particles can be charged uniformly into all the corners of the mold. As a result, polypropylene foamed product having a uniform density distribution and excellent adhesion free from voids among particles can easily be obtained.

(3) A low compression ratio makes it possible to use foamed particles having a high foam density, which brings about a great industrial merit on production and transportation of foamed particles.

While the invention has been described in detail and with reference to specific embodiments thereof, it will be apparent to one skilled in the art that various changes and modifications can be made therein without departing from the spirit and scope thereof.

What is claimed is:

1. A method of producing a polypropylene resin molded product from foamed polypropylene particles, which comprises introducing a pressurizing gas into foamed polypropylene partilces having closed cells so that the particles have an internal gas pressure of from 0.3 to 2.5 Kg/cm$^2$G, charging the particles in a mold cavity while compressing the particles with a pressurizing inorganic gas until the initial apparent volume of the particles is reduced to 50 to 99%, removing the gas from the mold cavity while keeping the foamed particles in a copressed state, and introducing steam in the cavity to cause adhesion of the compressed foamed particles.

2. A method as in claim 1, wherein the compressing with a pressurizing inorganic gas is carried out until the initial apparent volume of the particles is reduced to 60 to 90%.

3. A method as in claim 1, wherein the foamed particles having an internal gas pressure of from 0.3 to 2.5 Kg/cm$^2$G are charged in the mold in several divided portions while controlling a compression ratio represented by the formula:

$$\frac{W/\sigma - V}{W/\sigma} \times 100 \ (\%)$$

wherein W represents a weight (g) of a molded product; V represents a volume (l) of a molded product; and $\sigma$ represents a bulk density (g/l) of foamed particles in air, within a range of from 1% to less than 40%.

4. A method as in claim 3, wherein said foamed polypropylene particles are pressurized with a pressurizing gas having a pressure higher than the pressure inside a mold cavity by at least 0.5 Kg/cm$^2$ for a period of 1 hour or more, and the foamed particles having an internal gas pressure are charged in the cavity having an elevated pressure of from 0.5 to 5.0 Kg/cm$^2$G in several divided portions using a pressurizing gas having a pressure higher than that of the cavity by at least 0.5 Kg/cm$^2$G.

5. A method as in claim 3, wherein said compression ratio is controlled within a range of from 1 to 20%.

6. A method as in claim 1, wherein said mold cavity is formed by a pair of a female and a male each having a steam chamber.

7. A method as in claim 6, wherein steam is introduced first into a steam chamber of either one of the female and male and, after an escape of the introduced steam out of the mold through another steam chamber, introduced then into said another steam chamber and, after an escape of the introduced steam out of the mold through the steam chamber to which steam is first introduced, steam is introduced into both the chambers simultaneously followed by escaping out of the mold through the chambers.

* * * * *